United States Patent
Gulash

(10) Patent No.: US 9,786,192 B2
(45) Date of Patent: Oct. 10, 2017

(54) ASSESSING DRIVER READINESS FOR TRANSITION BETWEEN OPERATIONAL MODES OF AN AUTONOMOUS VEHICLE

(71) Applicant: Toyota Motor Engineering & Manufacturing North America, Inc., Erlanger, KY (US)

(72) Inventor: Emery Charles Gulash, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 30 days.

(21) Appl. No.: 14/883,558

(22) Filed: Oct. 14, 2015

(65) Prior Publication Data

US 2017/0110022 A1 Apr. 20, 2017

(51) Int. Cl.
| | |
|---|---|
| *G09B 9/052* | (2006.01) |
| *G09B 5/06* | (2006.01) |
| *G08B 23/00* | (2006.01) |
| *G10L 21/18* | (2013.01) |
| *G01C 22/00* | (2006.01) |

(52) U.S. Cl.
CPC ............ *G09B 9/052* (2013.01); *G08B 23/00* (2013.01); *G09B 5/06* (2013.01); *G01C 22/00* (2013.01); *G10L 21/18* (2013.01)

(58) Field of Classification Search
CPC .......... G08B 23/00; G01C 22/00; G10L 21/18
USPC ............................................. 701/25; 704/275
See application file for complete search history.

(56) References Cited

U.S. PATENT DOCUMENTS

| | | | | |
|---|---|---|---|---|
| 6,236,968 | B1 * | 5/2001 | Kanevsky | G08B 21/06 704/270 |
| 6,438,472 | B1 * | 8/2002 | Tano | G01C 21/26 701/25 |
| 8,823,530 | B2 * | 9/2014 | Green | B60K 28/06 180/272 |
| 8,874,301 | B1 * | 10/2014 | Rao | G05D 1/0061 180/272 |
| 2010/0106356 | A1 * | 4/2010 | Trepagnier | G01S 17/023 701/25 |
| 2013/0070043 | A1 | 3/2013 | Geva et al. | |

(Continued)

OTHER PUBLICATIONS

National Highway Traffic Safety Administration; "National Highway Traffic Safety Administration Preliminary Statement of Policy Concerning Automated Vehicles"; 2013; (14 pages).

*Primary Examiner* — Thomas G Black
*Assistant Examiner* — Wae Louie
(74) *Attorney, Agent, or Firm* — Christopher G. Darrow; Darrow Mustafa PC

(57) ABSTRACT

An autonomous vehicle can transition between operational modes. The readiness of a vehicle driver for a transition can be assessed, particularly when transitioning from a first operational mode to a second operational mode that has a greater degree of manual involvement than the first operational mode. It can be determined whether an operational mode transition event has occurred while the vehicle is operating in the first operational mode. Responsive to determining that an operational mode transition event has occurred, an audial sample from a vehicle driver can be collected. It can be determined whether the vehicle driver is ready or non-ready to provide the greater degree of manual involvement for the second operational mode based on the collected audial sample.

17 Claims, 2 Drawing Sheets

(56) References Cited

U.S. PATENT DOCUMENTS

| | | | |
|---|---|---|---|
| 2013/0131908 A1* | 5/2013 | Trepagnier | B60W 30/00 701/23 |
| 2013/0222127 A1* | 8/2013 | Ray Avalani | B60Q 9/008 340/436 |
| 2013/0325482 A1* | 12/2013 | Tzirkel-Hancock | G10L 21/18 704/275 |
| 2014/0195120 A1* | 7/2014 | McClain | G08G 1/16 701/41 |
| 2014/0300479 A1 | 10/2014 | Wolter et al. | |
| 2015/0314783 A1* | 11/2015 | Nespolo | B60W 30/0953 701/301 |
| 2016/0068103 A1* | 3/2016 | McNew | B60Q 9/00 701/23 |
| 2017/0110022 A1* | 4/2017 | Gulash | G09B 9/052 |

* cited by examiner

ASSESSING DRIVER READINESS FOR TRANSITION BETWEEN OPERATIONAL MODES OF AN AUTONOMOUS VEHICLE

FIELD

The subject matter described herein relates in general to vehicles that have a plurality of operational modes including an autonomous operational mode and, more particularly, to the transitioning between different operational modes.

BACKGROUND

Some vehicles are configured to operate in a plurality of operational modes. An example of an operational mode is one in which a computing system is used to navigate and/or maneuver the vehicle along a travel route with minimal or no input from a human driver. Such vehicles are equipped with sensors that are configured to detect information about the surrounding environment, including the presence of objects in the environment. The detected information can be sent to the computing system. Other operational modes can include different levels of human input, including a manual mode in which a human driver is responsible for navigating and/or maneuvering the vehicle through the surrounding environment. Vehicles with a plurality of operational modes are configured to allow switching between the various operational modes.

SUMMARY

In one respect, the present disclosure is directed to a method of assessing the readiness of a driver for transitioning a vehicle from a first operational mode to a second operational mode. The second operational mode has a greater degree of manual involvement than the first operational mode. The method can include determining whether an operational mode transition event has occurred while the vehicle is operating in the first operational mode. The method can also include, responsive to determining that an operational mode transition event has occurred, collecting an audial sample from a vehicle driver. The method can further include determining whether the vehicle driver is ready or non-ready for the greater degree of manual involvement for the second operational mode based on the collected audial sample.

In another respect, the present disclosure is directed to a system for assessing the readiness of a driver for transitioning a vehicle from a first operational mode to a second operational mode. The second operational mode can have a greater degree of manual involvement than the first operational mode. The system can include a microphone and a processor operatively connected to the microphone. The processor can be programmed to initiate executable operations. The executable operations can include determining whether an operational mode transition event has occurred while the vehicle is operating in the first operational mode. The executable operations can also include, responsive to determining that an operational mode transition event has occurred, collecting an audial sample from a vehicle driver. Such an audial sample can be collected by the microphone. The executable operations can further include determining whether the vehicle driver is ready or non-ready for the greater degree of manual involvement for the second operational mode based on the collected audial sample.

In yet another respect, the present disclosure is directed to a computer program product for assessing the readiness of a driver for transitioning a vehicle from a first operational mode to a second operational mode. The second operational mode can have a greater degree of manual involvement than the first operational mode. The computer program product can include a computer readable storage medium having program code embodied therein. The program code can be executable by a processor to perform a method. The method can include determining whether an operational mode transition event has occurred while the vehicle is operating in the first operational mode. The method can also include, responsive to determining that an operational mode transition event has occurred, collecting an audial sample from a vehicle driver. The method can further include determining whether the vehicle driver is ready or non-ready for the greater degree of manual involvement for the second operational mode based on the collected audial sample.

DETAILED DESCRIPTION

Figure 1:
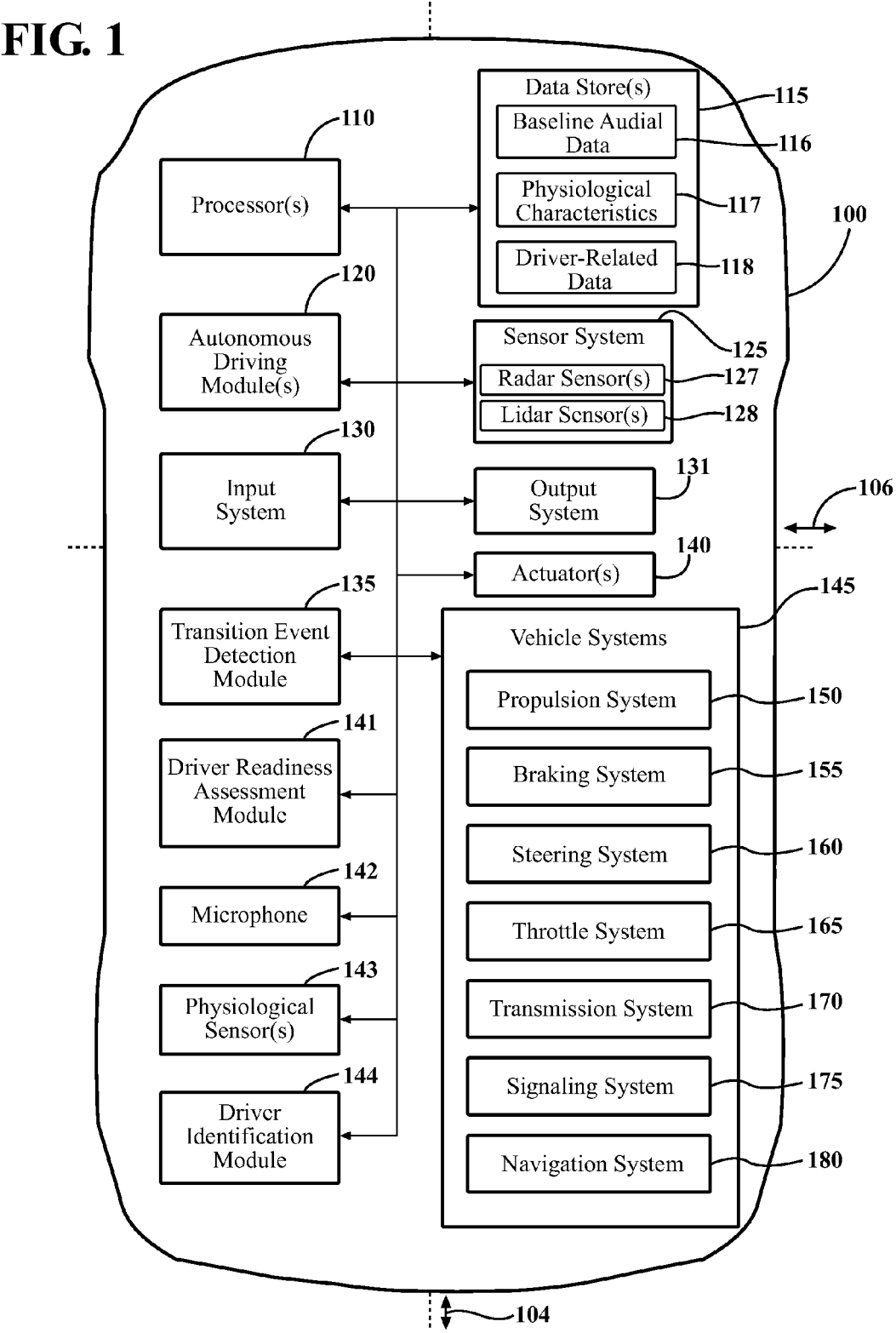
FIG. 1 is an example of an autonomous vehicle configured to assess driver readiness for a transition between different operational modes of the autonomous vehicle.

This detailed description relates to assessing the readiness of a driver for transitioning a vehicle from a first operational mode to a second operational mode. This detailed description is more particularly related to instances in which the second operational mode has a greater degree of manual involvement than the first operational mode. Responsive to determining that an operational mode transition event has occurred, an audial sample from a vehicle driver can be collected. It can be determined whether the vehicle driver is ready or non-ready for the greater degree of manual involvement for the second operational mode based on the collected audial sample. The present detailed description relates to systems, methods and computer program products that incorporate such features. In at least some instances, such systems, methods and computer program products can improve performance and/or safety of an autonomous vehicle.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-2, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Figure 2:
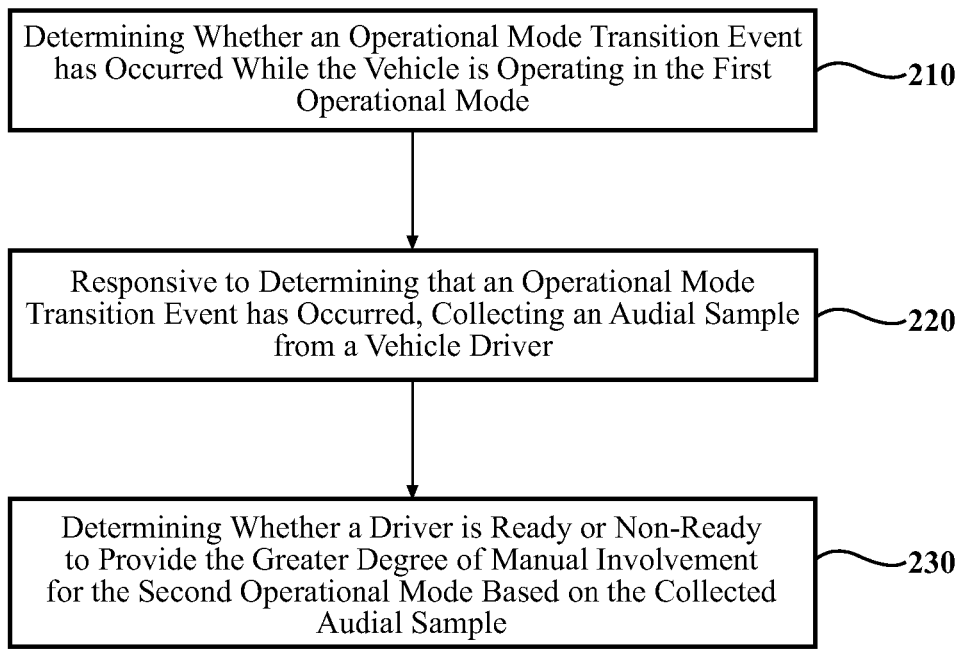
FIG. 2 is an example of a method of assessing driver readiness for a transition between a first operational mode and a second operational mode.

Referring to FIG. 1, an example a vehicle 100 is shown. As used herein, "vehicle" means any form of motorized transport. In one or more implementations, the vehicle 100 can be an automobile. While arrangements will be described herein with respect to automobiles, it will be understood that embodiments are not limited to automobiles. In some implementations, the vehicle 100 may be a watercraft, an aircraft, a train, or any other form of motorized transport.

According to arrangements herein, the vehicle 100 can be an autonomous vehicle. As used herein, "autonomous vehicle" means a vehicle that configured to operate in an autonomous mode. "Autonomous mode" means that one or more computing systems are used to navigate and/or maneuver the vehicle along a travel route with minimal or no input from a human driver. In one or more arrangements, the vehicle 100 can be highly automated.

The vehicle 100 can have a plurality of operational modes. For instance, the vehicle 100 can have an unmonitored autonomous operational mode. "Unmonitored autonomous operational mode" means that one or more computing systems are used to navigate and/or maneuver the vehicle along a travel route with no input or supervision required from a human driver. As an example, the unmonitored autonomous operational mode can include Level 4 (L4), as defined by the National Highway Traffic Safety Administration in its Preliminary Statement of Policy Concerning Automated Vehicles (May 30, 2013) ("NHTSA 2013 Policy"), which is incorporated herein by reference. The vehicle 100 can have a monitored autonomous operational mode. "Monitored autonomous operational mode" means that one or more computing systems are used to navigate and/or maneuver the vehicle with at least some human driver supervision required. As an example, the monitored autonomous operational mode can include Level 3 or L3, as defined by the NHTSA 2013 Policy. In some instances, when the vehicle 100 is in a monitored autonomous operational mode, a signal (e.g., an audial signal, a visual signal, a haptic signal, etc.) can be presented to a human driver to take an action within a predetermined amount of time. If such action is not taken within the predetermined amount of time, one or more safety maneuvers can be implemented.

The vehicle 100 can have one or more semi-autonomous operational modes. "Semi-autonomous operational mode" means that a portion of the navigation and/or maneuvering of the vehicle along a travel route is performed by one or more computing systems, and a portion of the navigation and/or maneuvering of the vehicle along a travel route is performed by a human driver. As an example, the semi-autonomous operational mode can include Levels 2 (L2) and/or Level 1 (L1), as defined by the NHTSA 2013 Policy. One example of a semi-autonomous operational mode is when an adaptive cruise control system is activated. In such case, the speed of a vehicle can be automatically adjusted to maintain a safe distance from a vehicle ahead based on data received from on-board sensors, but the vehicle is otherwise operated manually by a human driver. Upon receiving a driver input to alter the speed of the vehicle (e.g. by depressing the brake pedal to reduce the speed of the vehicle), the adaptive cruise control system is deactivated and the speed of the vehicle is reduced.

The vehicle 100 can have a manual operational mode. "Manual operational mode" means that a substantial majority or all of the navigation and/or maneuvering of the vehicle along a travel route is performed by a human driver with minimal or no input from a computing system. As an example, the manual operational mode can include Level 0 (L0), as defined by the NHTSA 2013 Policy.

The vehicle 100 can have a special operational mode. "Special operational mode" means that the navigation and/or maneuvering of the vehicle can be controlled by one or more computing systems to implement one or more default driving maneuvers, one or more safety maneuvers, and/or one or more other actions. In one or more arrangements, the special operational mode can include a predetermined safety maneuver based on the current driving environment. For instance, if a human driver does not take control of the vehicle 100 within a predetermined amount of time, the safety maneuver may include moving the vehicle 100 to the side of the road, moving the vehicle 100 onto the shoulder of the road, reducing the speed of the vehicle 100, turning the vehicle 100 into the nearest parking lot, bringing the vehicle 100 to a stop, keeping the vehicle 100 stopped, or having the vehicle 100 take the next exit on a highway, just to name a few possibilities. In one or more arrangements, the special operational mode can include taking one or more actions to gain or focus a driver's attention. For instance, in one or more arrangements, the action can be reducing the radio volume or turning the radio off.

The vehicle 100 can be configured to be switched between the various operational modes. Such switching can be implemented in any suitable manner, now known or later developed. In one or more arrangements, the switching can be performed at least in part using one or more elements of the vehicle 100 described herein. The switching can be performed automatically, or it can be done responsive to receiving a manual input or request.

In one or more arrangements, the switching can be from a first operational mode to a second operational mode. In some instances, the second operational mode can have a greater degree of manual involvement than the first operational mode. A "greater degree of manual involvement" means that a human driver is required to or should increase his or her level of supervision and/or input with respect to the control of at least the navigation and/or maneuvering of the vehicle. One example of when the second operational mode can have a greater degree of manual involvement than the first operational mode is when the first operational mode is an unmonitored autonomous operational mode and the second operational mode is a monitored autonomous operational mode or a manual operational mode. Another example of when the second operational mode can have a greater degree of manual involvement than the first operational mode is when the first operational mode is a monitored autonomous operational mode and the second operational mode is a semi-autonomous operational mode or a manual operational mode.

In some instances, the second operational mode can have a lesser degree of manual involvement than the first operational mode. A "lesser degree of manual involvement" means that a human driver can decrease his or her level of supervision and/or input with respect to the control of at least the navigation and/or maneuvering of the vehicle. One example of when the second operational mode can have a lesser degree of manual involvement than the first operational mode is when the first operational mode is a manual operational mode, and the second operational mode is a semi-autonomous operational mode, a monitored autonomous operational mode, or an unmonitored autonomous operational mode. Another example is when the first operational mode is a monitored autonomous operational mode, and the second operational mode is an unmonitored autonomous operational mode.

In one or more arrangements, the vehicle 100 can be configured to provide a transition alert to a vehicle occupant (e.g., the driver). "Transition alert" is any communication, indication, and/or notification of an upcoming, imminent, impending, future, recommended, suggested, and/or proposed switch between operational modes of a vehicle. The transition alert can help to increase the driver's awareness and readiness for an upcoming shift to a different operational mode of the vehicle 100, particularly one that has a greater degree of manual involvement. The transition alert can be output or presented within the vehicle 100.

The transition alert can have any suitable form. For instance, the transition alert can be a visual transition alert, an audial transition alert, a haptic transition alert, and/or combinations thereof. "Visual transition alert" is any transition alert that is perceptible to the human sense of sight. "Audial transition alert" is any transition alert that is perceptible to the human sense of hearing. "Haptic transition alert" is any transition alert that is perceptible to the human sense of touch. Various non-limiting examples of such transition alerts will now be provided.

The visual transition alert can be presented to the vehicle occupant (e.g., the driver) using an output system 131 of the vehicle 100. For instance, the visual transition alert can be presented on one or more of displays. The visual transition alert can have any suitable form. In one or more arrangements, the visual transition alert can be a message. For instance, the message can be a question, such as "Operational Mode Transition Ahead—Are you ready?", or it can be a statement, such as "Upcoming Operational Mode Transition". Alternatively or in addition, the visual transition alert can include one or more lights. The one or more lights can be selectively activated and/or deactivated to alert a driver of a transition. For instance, the one or more lights can flash to indicate an upcoming transition of vehicle operational modes. Alternatively, the one or more lights can change color to indicate an upcoming transition of vehicle operational modes.

The audial transition alert can be presented to the vehicle occupant (e.g., the driver) using the output system 131. For instance, the audial transition alert can be presented on one or more of speakers. The audial transition alert can have any suitable form. For instance, the audial transition alert can be a sound, a message (e.g., word(s), phrase(s), sentence(s), and/or questions), and/or a request.

The haptic transition alert can have any suitable form. For instance, the haptic transition alert can be presented by causing a vibration or other attention getting movement of the driver's seat or other vehicle component. However, it will be understood that the haptic transition alerts are not limited to vibrations. The haptic transition alert can be presented to the vehicle occupant (e.g., the driver) using the any suitable element. For instance, the vehicle 100 (or the output system 131 of the vehicle 100) can include one or more haptic actuators (not shown) to cause a haptic transition alert to be presented. The haptic actuator(s) can be any element or combination of elements operable to modify, adjust, move, and/or alter one or more elements of the vehicle 100 to responsive to receiving signals or other inputs from a processor (e.g., processor 110) and/or a module (e.g., autonomous driving module 120). Any suitable haptic actuator can be used. For instance, the one or more haptic actuators can include motors, pneumatic actuators, hydraulic pistons, relays, solenoids, and/or piezoelectric actuators, just to name a few possibilities.

It will be appreciated that any combination of the above types of transition alerts and/or other types of transition alerts can be provided. For instance, in one or more arrangements, a visual transition alert and an audial transition alert can be used in combination in any suitable manner.

The vehicle 100 can include various elements, some of which may be a part of an autonomous driving system. Some of the possible elements of the vehicle 100 are shown in FIG. 1 and will now be described. It will be understood that it is not necessary for the vehicle 100 to have all of the elements shown in FIG. 1 or described herein. The vehicle 100 can have any combination of the various elements shown in FIG. 1. Further, the vehicle 100 can have additional elements to those shown in FIG. 1. In some arrangements, vehicle 100 may not include one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances. Some of the elements may be located off-board the vehicle 100 or remote from the vehicle 100.

The vehicle 100 can include one or more processors 110. "Processor" means any component or group of components that are configured to execute any of the processes described herein or any form of instructions to carry out such processes or cause such processes to be performed. The processor(s) 110 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 110 can include at least one hardware circuit (e.g., an integrated circuit) configured to carry out instructions contained in program code. In arrangements in which there is a plurality of processors 110, such processors can work independently from each other or one or more processors can work in combination with each other. In one or more arrangements, the processor(s) 110 can be a main processor of the vehicle 100. For instance, the processor 110 can be an electronic control unit (ECU) or an engine control unit.

The vehicle 100 can include one or more data stores 115 for storing one or more types of data. The data store(s) 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 115 can be a component of the processor(s) 110, or the data store(s) 115 can be operatively connected to the processor 110 for use thereby. The term "operatively connected," as used throughout this description, can include direct or indirect connections, including connections without direct physical contact.

In one or more arrangements, the one or more data stores 115 can include baseline audial data 116. The baseline audial data 116 can include samples of the voice and/or speech of a vehicle driver or a potential vehicle driver. The baseline audial data 116 can include a driver and/or a potential driver speaking one or more things (e.g., one or more letters, one or more words, one or more phrases, one or more sentences, one or more numbers, one or more expressions, and/or one or more paragraphs, just to name a few possibilities). The baseline audial data 116 can be in any suitable form. In some instances, the baseline audial data 116 can be stored in one or more data stores 115 located onboard the vehicle 100. Alternatively or in addition, at least a portion of the baseline audial data 116 can be stored in one or more data stores 115 located remote from the vehicle 100.

The baseline audial data 116 can be obtained at any suitable time. For instance, the baseline audial data 116 can be obtained from a driver or potential driver of the vehicle 100 under normal and/or stress free conditions, and/or when the driver or potential driver is attentive. The baseline audial data 116 can be provided by a vehicle driver or a potential vehicle driver at any point prior to driving the vehicle 100. For instance, each driver or potential driver of the vehicle 100 can provide an audial sample the first time the driver operates the vehicle or sooner. In some arrangements, a driver of the vehicle 100 can provide a baseline audial sample prior to each time the person operates the vehicle 100. For instance, when a driver of the vehicle turn on the vehicle 100, the driver can be prompted to provide a baseline audial sample.

In one or more arrangements, the one or more data stores 115 can include one or more physiological characteristics 117. In one or more arrangements, the physiological characteristics can be associated with a particular readiness condition of the driver (e.g., alert, drowsy, distracted, groggy, impaired, sleepy, attentive, sick, etc.). Examples of the physiological characteristics can include heart rate, eye movements, perspiration, etc. For example, a slow heart rate relative to a particular heart rate threshold can indicate that the person is sleeping or is not attentive, and, therefore, the driver is not ready for a change in the operational mode of the vehicle 100. As another example, the physiological characteristics can be whether the person's eyes are open or closed. Closed eyes can indicate that the person is sleeping or is not attentive, and, therefore, the driver is not ready for a change in the operational mode of the vehicle 100.

In one or more arrangements, the one or more data stores 115 can include driver-related data 118. "Driver-related data" includes any data that can be used to identify a current driver of the vehicle 100. Examples of driver-related data 118 include retinal data, iris data, facial data, palm data, fingerprint data, voice data, weight data and/or other biometric data. Additional examples of driver-related data 118 can include a pressure profile of a person sitting in the driver seat and/or a seat adjustment profile. Still further examples of driver-related data 118 can include a name, password, code or other input received from the driver, such as through an in-vehicle user-interface. Yet another example of driver-related data 118 is a mobile device (e.g., mobile phone, tablet computer, laptop computer, key fob, etc.) associated with a particular person.

In one or more arrangements, the one or more data stores 115 can include map data. The map data can include maps of one or more geographic areas or regions. The map data can include information or data on roads, traffic control devices, structures, features, landmarks in the one or more geographic areas. The map data can be in any suitable form. In some instances, the map data can include aerial views of an area. In some instances, the map data can include ground views of an area, including 360 degree ground views. The map data can be highly detailed. In some instances, the map data can be located onboard the vehicle 100. Alternatively, at least a portion of the map data can be located remote from the vehicle 100.

In one or more arrangements, the one or more data stores 115 can include a set of driving scenes. The term "set of driving scenes" is defined as one or more driving scenes. "Driving scenes" means sensor system data of a location within a geographic area. As an example, the driving scenes can be images or videos. The driving scenes can include any suitable sensor system data of a road, other vehicles, pedestrians, an intersection, buildings, structures, traffic control devices, lane markers, landmarks, features. In some instances, the set of driving scenes can be located in a data store 115 onboard the vehicle 100. Alternatively, at least a portion of the set of driving scenes can be located in a data store 115 remote from the vehicle 100.

In one or more arrangements, the one or more data stores 115 can include a set of scene markers. The term "set of scene markers" is defined as one or more scene markers. A "scene marker" is an object or feature of interest located in and/or describing a driving scene. Examples of scene markers can include any suitable sensor system data of a road, an intersection, buildings, structures, traffic control devices, lane markers, landmarks, road paint, signs, poles, curbs, features. In some instances, the set of scene markers can be located onboard the vehicle 100. Alternatively, at least a portion of the set of scene markers can be located remote from the vehicle 100.

The vehicle 100 can include one or more autonomous driving modules 120. The autonomous driving module(s) 120 can be implemented as computer readable program code that, when executed by a processor, implement various processes, some of which are described herein. The autonomous driving module(s) 120 can be configured to perform various functions, including, for example, environment perception, planning/decision-making, and/or control. The autonomous driving module(s) 120 can be configured to determine a travel route, implement the determined travel route, determine a modification to a current driving maneuver of the vehicle 100, and/or cause, directly or indirectly, a current driving maneuver of the vehicle 100 to be modified. The autonomous driving module(s) 120 can be a component of the processor 110, or the autonomous driving module(s) 120 can be executed on and/or distributed among other processing systems to which the processor(s) 110 is operatively connected.

The autonomous driving module(s) 120 can include instructions (e.g., program logic) executable by the processor(s) 110. Such instructions can include instructions to execute various vehicle functions and/or to transmit data to, receive data from, interact with, and/or control the vehicle 100 or one or more systems thereof (e.g. one or more of vehicle systems 145). Alternatively or in addition, the data store(s) 115 may contain such instructions.

As noted above, the vehicle 100 can include a sensor system 125. The sensor system 125 can include one or more sensors. "Sensor" means any device, component and/or system that can detect, determine, assess, monitor, measure, quantify and/or sense something. The one or more sensors can be configured to detect, determine, assess, monitor, measure, quantify and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 125 includes a plurality of sensors, the sensors can work independently from each other. Alternatively, two or more of the sensors can work in combination with each other. In such case, the two or more sensors can form a sensor network. The sensor system 125 and/or the one or more sensors can be operatively connected to the processor(s) 110, the data store(s) 115, the autonomous driving module(s) 120 and/or other element of the vehicle 100 and/or an autonomous driving system.

The sensor system 125 can include any suitable type of sensor. For example, the sensor system 125 can include one or more sensors configured to detect, determine, assess, monitor, measure, quantify and/or sense information about the vehicle 100. Alternatively or in addition, the sensor system 125 can include one or more sensors configured to detect, determine, assess, monitor, measure, quantify and/or sense information about the external environment in which the vehicle 100 is located, including information about objects in the external environment. Such objects may be stationary object or moving objects. Alternatively or in addition to one or more of the above examples, the sensor system 125 can include one or more sensors configured to detect, determine, assess, monitor, measure, quantify and/or sense the location of the vehicle 100 and/or the location of objects in the environment relative to the vehicle 100. Various examples of these and other types of sensors will be described herein. It will be understood that the embodiments are not limited to the particular sensors described.

The sensor system 125 can include one or more sensors configured to detect, determine, assess, monitor, measure, quantify and/or sense position and orientation changes of the vehicle 100, such as, for example, based on inertial acceleration. In one or more arrangements, the sensor system 125 can include speedometers, accelerometers, gyroscopes and/or other suitable sensors. The sensor system 125 can include sensors that can monitor one or more internal systems of the vehicle 100 (e.g., an $O_2$ monitor, a fuel gauge, an engine oil temperature, coolant temperature, etc.).

The sensor system 125 can include one or more sensors configured to sense the external environment of the vehicle 100. Such environment sensors can be configured to detect, determine, assess, monitor, measure, quantify and/or sense objects in at least a portion of the external environment of the vehicle 100 and/or information/data about such objects. Various examples of such sensors will be described herein. However, it will be understood that the embodiments are not limited to the particular sensors described.

In one or more arrangements, the sensor system 125 can include one or more radar sensors 127. "Radar sensor" means any device, component and/or system that can detect, determine, assess, monitor, measure, quantify and/or sense something using at least in part radio signals. The one or more radar sensors 127 can be configured to detect, determine, assess, monitor, measure, quantify and/or sense, directly or indirectly, the presence of one or more objects in the external environment of the vehicle 100, the position of each detected object relative to the vehicle 100, the distance between each detected object and the vehicle 100 in one or more directions (e.g. in the longitudinal direction 104, the lateral direction 106 and/or other direction(s)), the elevation of each detected object, the speed of each detected object and/or the movement of each detected object. The one or more radar sensors 127, or data obtained thereby, can determine the speed of objects in the external environment of the vehicle 100. The one or more radar sensors 127 can have three dimensional coordinate data associated with it the objects.

In one or more arrangements, the sensor system 125 can include one or more lidar sensors 128. "Lidar sensor" means any device, component and/or system that can detect, determine, assess, monitor, measure, quantify and/or sense something using at least in part lasers. For instance, the one or more lidar sensors 128 can be or can be included as part of a laser rangefinder or a lidar. Such devices can include a laser source and/or laser scanner configured to emit a laser and a detector configured to detect reflections of the laser. The laser rangefinder or lidar may be configured to operate in a coherent or an incoherent detection mode.

The one or more lidar sensors 128 can be configured to detect, determine, assess, monitor, measure, quantify and/or sense, directly or indirectly, the presence of one or more objects in the external environment of the vehicle 100, the position of each detected object relative to the vehicle 100, the distance between each detected object and the vehicle 100 in one or more directions (e.g. in the longitudinal direction 104, the lateral direction 106 and/or other direction(s)), the elevation of each detected object, the speed of each detected object, and/or the movement of each detected object.

Alternatively or in addition to any of the sensors described above, the sensor system 125 can include other types of sensors. As an example, the sensor system 125 can include one or more ultrasonic sensors (not shown). Further, the sensor system 125 can include one or more cameras. "Camera" includes any device(s), component(s), and/or system(s) configured to capture visual data. "Visual data" includes video and/or image information/data. The visual data can be in any suitable form.

The one or more cameras can be high resolution cameras. The high resolution can refer to the pixel resolution, the spatial resolution, spectral resolution, temporal resolution and/or radiometric resolution. In one or more arrangements, the one or more cameras can be high dynamic range (HDR) cameras or infrared (IR) cameras. In one or more arrangements, one or more of the cameras can include a lens (not shown) and an image capture element (not shown). The image capture element can be any suitable type of image capturing device or system, including, for example, an area array sensor, a Charge Coupled Device (CCD) sensor, a Complementary Metal Oxide Semiconductor (CMOS) sensor, a linear array sensor, a CCD (color or monochrome). The image capture element may capture images in any suitable wavelength on the electromagnetic spectrum. The image capture element may capture color images and/or grayscale images. The one or more of the cameras can be configured with zoom in and/or zoom out capabilities.

The one or more cameras can be located in any suitable portion of the vehicle 100. In one or more arrangements, one or more of the cameras can be located, oriented, positioned, configured, operable, and/or arranged to capture visual data from at least a portion of the interior of the vehicle 100 (e.g., a vehicle occupant area). For instance, one or more of the cameras can be located, oriented, positioned, configured, operable, and/or arranged to capture visual data of a vehicle driver or other vehicle occupant. In one or more arrangements, one or more of the cameras can be located, oriented, positioned, configured, operable, and/or arranged to capture visual data from at least a portion of the external environment of the vehicle 100.

The sensor system 125, the processor 110, and/or one or more other elements of the vehicle 100 can be operable to control movements of one or more of the sensors of the sensor system 125. It should be noted that any of the sensors described herein can be provided in any suitable location with respect to the vehicle 100. For instance, one or more sensors can be located within the vehicle 100, one or more sensors can be located on the exterior of the vehicle and/or one or more sensors can be located so as to be exposed to the exterior of the vehicle 100.

The vehicle 100 can include an input system 130. An "input system" includes any device(s), component(s), system(s), element(s), or arrangement(s), or groups thereof that enable information/data to be entered into a machine. The input system 130 can receive an input from a vehicle occupant (e.g. a driver or a passenger). Any suitable input system 130 can be used, including, for example, a keypad, display, touch screen, multi-touch screen, button, joystick, mouse, trackball, microphone 142 and/or combinations thereof. A "microphone" includes one or more devices, one or more systems, one or more components, one or more elements, and/or one or more instruments that at least converts received sound waves into electrical signals.

The vehicle 100 can include an output system 131. An "output system" includes any device(s), component(s), system(s), element(s), or arrangement(s), or groups thereof that enable information/data to be presented to a vehicle occupant (e.g. a person, a vehicle driver, etc.). The output system 131 can present information/data to a vehicle occupant. The output system 131 can include a display. A "display" includes one or more devices, one or more systems, one or more components, and/or one or more elements that present data in a form that is perceptible to the human sense of sight. Alternatively or in addition, the output system 131 may include one or more microphones 142, one or more earphones and/or one or more speakers. Some components of the vehicle 100 may serve as both a component of the input system 130 and a component of the output system 131.

The vehicle 100 can include a transition event detection module 135. The transition event detection module 135 can be implemented as computer readable program code that, when executed by a processor, implement the various processes described herein. The transition event detection module 135 can be a component of the processor(s) 110, or the transition event detection module 135 can be executed on and/or distributed among other processing systems to which the processor(s) 110 is operatively connected.

The transition event detection module 135 can be configured to determine whether a transition event has occurred. A transition event may warrant potentially switching the current operational mode of the vehicle 100 to a different operational mode. In some instances, such an event may be indicative of a problem or other issue which is to be communicated to the driver to prepare to take a greater degree of involvement in the vehicle control. The transition event detection module 135, the autonomous driving module(s) 120, and/or the processor(s) 110 can be configured to analyze data obtained, captured, and/or acquired by the sensor system 125 to identify one or more objects in the external environment. In some arrangements, one or more of these elements can be configured to identify the nature of the objects using any suitable technique, including, for example, template matching, computer vision and/or image processing techniques and/or other artificial or computational intelligence algorithms or machine learning methods.

The transition event detection module 135 can determine whether a transition event has occurred in any suitable manner, now known or later developed. Various examples of ways of determining whether a transition event has occurred will now be described. However, it will be understood that arrangements herein are not limited to these examples. Indeed, there can be various other ways of determining whether a transition event has occurred, as an alternative or in addition to the ways described below.

As an example, in one or more arrangements, visual or other data can be captured of the external environment of the vehicle 100, such as by the sensor system 125. The captured data can be compared to the map data to determine whether the captured data matches the map data. In this context, "match" or "matches" means that the captured data and the predetermined data (e.g., the map data) are identical. In some embodiments, "match" or "matches" can also mean that the captured data and the predetermined data map data are substantially identical. For instance, the captured data and the predetermined data can match within a predetermined probability (e.g., at least about 85%, at least about 90%, at least about 95% or greater) or confidence level.

If there is a sufficient mismatch between the captured data and the map data or they otherwise do not match, it can be determined that an operational mode transition event has occurred. For instance, a sufficient mismatch can occur if there is a construction zone, if the road has been repainted, if there is snow on the ground, etc. When highly detailed map data is used, even relatively minor deviations from the map data can result in a determination that an operational mode transition event has occurred.

As another example, in one or more arrangements, one or more driving scenes can be captured along a travel route. The captured one or more driving scenes can be compared to the set of driving scenes. An operational mode transition event can be determined to have occurred when there is a sufficient mismatch between the captured one or more driving scenes and the predetermined set of driving scenes.

In one or more arrangements, the captured one or more driving scenes can be analyzed to determine whether one or more scene markers are included in the captured driving scene(s). If one or more scene markers of the set of scene markers are not included in the captured one or more driving scenes, then a sufficient mismatch can be determined to have occurred.

The sensor system 125 of the vehicle 100 can sense the external environment of the vehicle 100. The sensor system 125 may detect various features in the external environment (e.g., lane markings, landmarks such as signs, poles, intersections, etc.). These detected features can be matched with the set of scene markers. If the transition event detection module 135 determines a sufficient mismatch (e.g., few of observed features match their corresponding high-priority descriptors), then it can be determined that an operational mode transition event has occurred. In one or more arrangements, if the vehicle 100 encounters an unexpected situation (e.g., a work flag, an unusual type of railroad or other crossing, etc.), then it can be determined that an operational mode transition event has occurred.

The vehicle 100 can include a driver readiness assessment module 141. The driver readiness assessment module 141 can be implemented as computer readable program code that, when executed by a processor, implement the various processes described herein. The driver readiness assessment module 141 can be a component of the processor(s) 110, or the driver readiness assessment module 141 can be executed on and/or distributed among other processing systems to which the processor(s) 110 is operatively connected. In one or more arrangements, the driver readiness assessment module 141 can be located onboard the vehicle 100. Alternatively, in one or more arrangements, the driver readiness assessment module 141 can be located in a remote source, such as one or more remote data stores (e.g., a cloud-based data store).

The driver readiness assessment module 141 can be configured to determine whether a current driver of the vehicle 100 is ready or non-ready to provide the greater degree of manual involvement for a different operational mode of the vehicle 100. The driver readiness assessment module 141 can be configured to make such a determination based on a collected audial sample from the current driver of the vehicle 100. The driver can provide such an audial sample by, for example, the microphone 142.

The driver readiness assessment module 141 can determine whether the driver is ready or non-ready based on an audial sample. The audial sample can be collected in real-time. For instance, the audial sample can be collected in response to a determination by the driver readiness assessment module 141 that a transition event has occurred. In one or more arrangements, the driver readiness assessment module 141 can cause the vehicle 100 to automatically collect audial data from the driver of the vehicle 100. In such case, the vehicle driver may not be prompted to provide an audial sample. In one or more arrangements, the driver readiness assessment module 141 can prompt a driver to provide a current audial sample. It should be noted that the driver readiness assessment module 141 can receive audial samples in any suitable one or more languages.

The driver readiness assessment module 141 can analyze the collected audial sample. Any suitable type of analysis can be performed on the collected audial sample. For instance, the collected audial sample can be compared to one or more baseline audial samples 116. If the collected audial sample does not match one of the baseline audial samples, the vehicle 100 can implement the special operational mode. If the collected audial sample matches one of the baseline audial samples 116, then the operational mode of the vehicle 100 can be switched as appropriate. As further examples, the collected audial sample can be analyzed independently of the baseline audial sample. For instance, one or more characteristics (e.g., the frequency, amplitude, wavelength, etc.) of the collected audial sample can be analyzed using any suitable technology or technique, now known or later developed, to assess the readiness of the driver.

The vehicle 100 can include one or more physiological sensors 143. The physiological sensor(s) 143 can be configured to detect, determine, assess, monitor, measure, quantify and/or sense information about a vehicle driver's current physiological condition. In one or more arrangements, the physiological sensor(s) 143 can include a heart rate monitor, a blood pressure monitor, a blood sugar level monitor, eye movement monitor, eyelid movement monitor, a galvanic skin response (GSR) monitor, an electroencephalograph (EEG), an electrocardiograph (ECG), an electromyograph (EMG), and/or an electronystagmograph (ENG), just to name a few possibilities. In one or more arrangements, the physiological sensor(s) 143 can include one or more biometric identification systems, including, for example, retinal, iris, facial, palm, fingerprint, voice and/or other biometric recognition technologies to identify the current driver of the vehicle 100. The physiological sensor(s) 143 can include a suitable camera (e.g., any of the cameras described above in connection with the sensor system 125), scanner, sensor, other hardware and/or software for retinal, iris, facial, palm, fingerprint, voice, and/or other biometric recognition.

Data acquired by the one or more physiological sensors 143 can be analyzed by the driver readiness assessment module 141. More particularly, the driver readiness assessment module 141 can be analyzed to determine whether a current driver of the vehicle 100 is ready or non-ready to provide the greater degree of manual involvement for a different operational mode of the vehicle 100. In one or more arrangements, such a determination can be used as a confirmation of the determination made by the driver readiness assessment module 141 based on the audial sample. As an example, one or more cameras can be used to capture the images of the driver's face. If the captured images reveal that the driver's eyes are closed, then the driver can be determined to be sleeping or otherwise inattentive. In such case, the vehicle 100 may switch to the special operational mode instead of the intended mode that requires a greater degree of manual input.

The driver physiological data can be collected in real-time. For instance, the driver physiological data can be collected in response to a determination by the driver readiness assessment module 141 that a transition event has occurred. In one or more arrangements, the driver readiness assessment module 141 can cause the one or more physiological sensors 143 to automatically collect the driver physiological data.

The driver readiness assessment module 141 can analyze the driver physiological data. For instance, the collected driver physiological data can be compared to one or more physiological characteristics 117. If the driver physiological data matches or falls within a range of one of the physiological characteristics 117, then a driver condition associated with such physiological characteristic 117 can be determined.

The vehicle 100 can include a driver identification module 144. The driver identification module 144 can be implemented as computer readable program code that, when executed by a processor, implement the various processes described herein. The driver identification module 144 can be a component of the processor(s) 110, or the driver identification module 144 can be executed on and/or distributed among other processing systems to which the processor(s) 110 is operatively connected.

The driver identification module 144 can be configured to determine the identity of the current driver of the vehicle 100. The identity of the driver can be used to select an appropriate baseline audial sample 116 for purposes of analysis. The driver identification module 144 can be configured to determine the identity of the current driver in real-time, as the driver may change at some point (e.g. after a segment of a drive).

In one or more arrangements, the driver identification module 144 can include one or more biometric identification systems, including, for example, retinal, iris, facial, palm, fingerprint, voice and/or other biometric recognition technologies to identify the driver. The driver identification module 144 can process data acquired by one or more of the physiological sensors 143.

In one or more arrangements, the driver identification module 144 can determine the identity of the driver based on the weight of a person sitting in the driver seat or a pressure profile of a person sitting in the driver seat. In such case, the sensor system 125 and/or the one or more physiological sensors 143 can include a weight sensor and/or a pressure sensor. In one or more arrangements, the driver identification module 144 can determine the identity of the driver based on a seat adjustment profile. Some vehicles can store seat adjustment profiles for one or more drivers of the vehicle. When a particular seat adjustment profile is selected or if a current seat adjustment profile matches a stored seat adjustment profile, then the driver identification module 144 can identify the driver based on the seat adjustment profile. In one or more arrangements, the driver identification module 144 can determine the identity of the driver based on a name, password, code or other input received from the driver, such as through the input system 130.

In one or more arrangements, the driver identification module 144 can determine the identity of the driver based on the detection of a mobile device associated with a particular individual. For instance, if the driver has a mobile phone, tablet, laptop computer, or key fob in the vehicle, then the driver identification module 144 can be configured to detect such device. For instance, the device can become communicatively linked with one or more systems of the vehicle 100.

The vehicle 100 can include one or more vehicle systems 145. Various examples of the one or more vehicle systems 145 are shown in FIG. 1. However, the vehicle 100 can include more, fewer or different systems. It should be appreciated that although particular vehicle systems are separately defined, each or any of the systems or portions thereof may be otherwise combined or segregated via hardware and/or software within the vehicle 100.

The vehicle 100 can include a propulsion system 150, a braking system 155, a steering system 160, throttle system 165, a transmission system 170, a signaling system 175, and/or a navigation system 180. Each of these systems will be described in turn below.

The propulsion system 150 can include one or more mechanisms, devices, elements, components, systems, and/or combinations thereof, now known or later developed, configured to provide powered motion for the vehicle 100. The braking system 155 can include one or more mechanisms, devices, elements, components, systems, and/or combinations thereof, now known or later developed, configured to decelerate the vehicle 100. The steering system 160 can include one or more mechanisms, devices, elements, components, systems, and/or combinations thereof, now known or later developed, configured to adjust the heading of the vehicle 100. The throttle system 165 can include one or more mechanisms, devices, elements, components, systems, and/or combinations thereof, now known or later developed, configured to control the operating speed of an engine/motor of the vehicle 100 and, in turn, the speed of the vehicle 100.

The transmission system 170 can include one or more mechanisms, devices, elements, components, systems, and/or combinations thereof, now known or later developed, configured to transmit mechanical power from the engine/motor of the vehicle 100 to wheels or tires of the vehicle 100. The signaling system 175 can include one or more mechanisms, devices, elements, components, systems, and/or combinations thereof, now known or later developed, configured to provide illumination for the driver of the vehicle 100 and/or to provide information with respect to one or more aspects of the vehicle 100.

The navigation system 180 can include one or more mechanisms, devices, elements, components, systems, applications and/or combinations thereof, now known or later developed, configured to determine the geographic location of the vehicle 100 and/or to determine a travel route for the vehicle 100. The navigation system 180 can include one or more mapping applications to determine a travel route for the vehicle 100. The navigation system 180 can include a global positioning system, a local positioning system or a geolocation system.

The processor(s) 110 and/or the autonomous driving module(s) 120 can be operatively connected to communicate with the various vehicle systems 145 and/or individual components thereof. For example, returning to FIG. 1, the processor(s) 110 and/or the autonomous driving module(s) 120 can be in communication to send and/or receive information from the various vehicle systems 145 to control the movement, speed, maneuvering, heading, direction, etc. of vehicle 100. The processor(s) 110 and/or the autonomous driving module(s) 120 may control some or all of these vehicle systems 145 and, thus, may be partially or fully autonomous.

The processor(s) 110 and/or the autonomous driving module(s) 120 may be operable to control the navigation and/or maneuvering of the vehicle 100 by controlling one or more of the vehicle systems 145 and/or components thereof. For instance, when operating in an autonomous mode, the processor(s) 110 and/or the autonomous driving module(s) 120 can control the direction and/or speed of the vehicle 100. The processor(s) 110 and/or the autonomous driving module(s) 120 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 140. The actuator(s) 140 can be any element or combination of elements operable to modify, adjust and/or alter one or more of the vehicle systems 145 or components thereof to responsive to receiving signals or other inputs from the processor(s) 110 and/or the autonomous driving module(s) 120. Any suitable actuator can be used. For instance, the one or more actuators 140 can include motors, pneumatic actuators, hydraulic pistons, relays, solenoids, and/or piezoelectric actuators, just to name a few possibilities.

Now that the various potential systems, devices, elements and/or components of the vehicle 100 have been described, various methods of using such a vehicle will now be described. Referring now to FIG. 2, an example of a method of assessing the readiness of a driver for transitioning a vehicle from a first operational mode to a second operational mode is shown. The first operational mode is different from the second operational mode. The second operational mode has a greater degree of manual involvement than the first operational mode. The method 200 will be described in connection with instances in which the second operational mode has a greater degree of manual involvement than the first operational mode. However, it will be understood that arrangements described herein are not limited in this respect.

Various possible steps of method 200 will now be described. The method 200 illustrated in FIG. 2 may be applicable to the embodiments described above in relation to FIG. 1, but it is understood that the method 200 can be carried out with other suitable systems and arrangements. Moreover, the method 200 may include other steps that are not shown here, and in fact, the method 200 is not limited to including every step shown in FIG. 2. The steps that are illustrated here as part of the method 200 are not limited to this particular chronological order. Indeed, some of the steps may be performed in a different order than what is shown and/or at least some of the steps shown can occur simultaneously.

At block 210, it can be determined whether an operational mode transition event has occurred while the vehicle is operating in the first operational mode. Such a determination can be made by the transition event detection module 135. Such a determination can be made continuously, periodically, irregularly, or even randomly. Such a determination can be made in real-time. If an operational mode transition event is detected, the method 200 can continue to block 220. If an operational mode transition event is not detected, the method 200 can end, or the method 200 can return to block 210.

At block 220, responsive to determining that an operational mode transition event has occurred, an audial sample can be collected from a vehicle driver. The audial sample can be collected using the microphone 142. In one or more arrangements, the audial sample can be collected automatically. In one or more arrangements, the vehicle driver can be prompted to provide an audial sample. Such prompting can be made using the output system 131 (e.g., a display and/or a speaker). The method 200 can continue to block 230.

At block 230, it can be determined whether the vehicle driver is ready or non-ready for the greater degree of manual involvement for the second operational mode based on the collected audial sample. The determination can be made by the processor 110 and/or the driver readiness assessment module 141.

The method 200 can end. Alternatively, the method 200 can return to block 210. As a further alternative, the method 200 can include additional and/or alternative blocks (not shown). For instance, in one or more arrangements, the method 200 can include responsive to determining that the vehicle driver is ready for the greater degree of manual involvement for the second operational mode based on the received audial sample, the vehicle 100 can be caused to switch from the first operational mode to the second operational mode. Such switching can be performed by the processor(s) 110, the autonomous driving module(s) 120, and/or the actuator(s) 140. As another example, responsive to determining that the vehicle driver is non-ready for the greater degree of manual involvement for the second operational mode based on the received audial sample, the vehicle 100 can be caused to switch from the first operational mode to a special operational mode. Such switching can be performed by the processor(s) 110, the autonomous driving module(s) 120, and/or the actuator(s) 140.

A non-limiting example of the method 200 will now be described. In this example, the vehicle 100 may be preparing to pass through an intersection. The vehicle 100 can be operating in an unmonitored autonomous operational mode. The transition event detection module 135 can determine that a transition event has or will occur due to the complexity of the intersection. In this example, the transition would be from the unmonitored autonomous operational mode to an operational mode with a greater degree of manual involvement (e.g., a monitored autonomous operational mode or a manual mode).

An audial sample can be collected from the driver of the vehicle 100, such as by the microphone 142. In some instances, the driver readiness assessment module 141 can request the driver to provide an audial sample. The audial sample can include the voice, speech and/or other sound produced by the driver. In one or more arrangements, the audial sample can be collected without notifying the driver. In one or more arrangements, the driver can be prompted to provide an audial sample. The driver can be requested to provide an audial sample in any suitable manner. As an example, the driver readiness assessment module can cause the output system 131 of the vehicle 100 to provide a visual and/or audial message to the driver. For instance, the message can include a request to the driver to say aloud and/or repeat one or more letters, one or more words, one or more phrases, one or more sentences, one or more expressions, one or more rhymes, one or more song lyrics, one or more verses, one or more poems, one or more numbers, and/or an alphabet or a portion thereof, just to name a few possibilities. In one or more arrangements, the message can be request for the driver to answer one or more questions. The driver can provide the audial sample by speaking aloud.

The driver readiness assessment module 141 can analyze the collected audial sample. The analysis can be cognitive and/or physiological in nature. In one or more arrangements, the analysis can include comparing the collected audial sample to a baseline audial sample 116 of the driver. If the collected audial sample substantially matches the baseline audial sample, then the driver readiness assessment module 141 can determine that the driver is ready for a greater degree of manual involvement. As such, in this example, the vehicle 100 can be caused to switch from the unmonitored autonomous operational mode to a monitored autonomous operational mode or a manual mode.

Alternatively or in addition, physiological data of the driver can be acquired by the one or more physiological sensors 143. Such driver physiological data can be analyzed by the driver readiness assessment module 141 to confirm whether the determination based on the acquired audial sample was correct. For instance, if the driver readiness assessment module 141 determines that the driver is alert based on the acquired physiological data, then the determination that the driver is ready for a greater degree of manual involvement based on the collected audial sample can be confirmed.

It will be appreciated that arrangements described herein can provide numerous benefits, including one or more of the benefits mentioned herein and/or other benefits. For example, arrangements described herein can improve the performance of an autonomous vehicle by providing for smooth transitioning between operational modes. Arrangements described herein can provide for enhanced communication between the vehicle and a human driver. Arrangements described herein can improve safety for autonomous vehicles by assessing whether a human driver is ready for a transition between operational modes of the vehicle. Arrangements described herein can also improve safety by taking appropriate safety measures if it is determined that a driver is not ready to provide an increased level of manual involvement in the operation of the vehicle. Further, arrangements described herein can increase the overall confidence level of vehicle occupants in the autonomous vehicle.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A method of assessing the readiness of a driver for transitioning a vehicle from a first operational mode to a second operational mode, the second operational mode having a greater degree of manual involvement than the first operational mode, the method comprising:
    determining whether an operational mode transition event has occurred while the vehicle is operating in the first operational mode;
    responsive to determining that an operational mode transition event has occurred, collecting an audial sample from a vehicle driver;
    determining whether the vehicle driver is ready or non-ready to provide the greater degree of manual involvement for the second operational mode based on the collected audial sample; and
    responsive to determining that the vehicle driver is ready for the greater degree of manual involvement for the second operational mode based on the collected audial sample, causing the vehicle to switch from the first operational mode to the second operational mode.

2. The method of claim 1, further including:
    responsive to determining that the vehicle driver is non-ready for the greater degree of manual involvement for the second operational mode based on the collected audial sample, causing the vehicle to switch from the first operational mode to a special operational mode.

3. The method of claim 2, wherein the special operational mode includes:
    providing at least one of a haptic alert, an audial alert, or a visual alert to the vehicle driver.

4. The method of claim 1, wherein determining whether the vehicle driver is ready or non-ready for the greater degree of manual involvement for the second operational mode based on the collected audial sample includes comparing the collected audial sample to a baseline audial sample of the driver.

5. The method of claim 1, further including:
    responsive to determining that an operational mode transition event has occurred, prompting the vehicle driver to provide the audial sample.

6. The method of claim 1, wherein collecting the audial sample from the vehicle driver is performed automatically.

7. The method of claim 1, further including:
    detecting one or more physiological characteristics of the vehicle driver.

8. The method of claim 7, further including:
    confirming the determination of whether the vehicle driver is ready or non-ready based on the detected one or more physiological characteristics of the vehicle driver.

9. A system for assessing the readiness of a driver for transitioning a vehicle from a first operational mode to a second operational mode, the second operational mode having a greater degree of manual involvement than the first operational mode, the system comprising:

a microphone; and a processor operatively connected to the microphone, the processor being programmed to initiate executable operations comprising:

determining whether an operational mode transition event has occurred while the vehicle is operating in the first operational mode;

responsive to determining that an operational mode transition event has occurred, collecting an audial sample from a vehicle driver using the microphone;

determining whether the vehicle driver is ready or non-ready to provide the greater degree of manual involvement for the second operational mode based on the collected audial sample; and responsive to determining that the vehicle driver is ready for the greater degree of manual involvement for the second operational mode based on the collected audial sample, causing the vehicle to switch from the first operational mode to the second operational mode.

10. The system of claim 9, wherein the executable operations further include:

responsive to determining that the vehicle driver is non-ready for the greater degree of manual involvement for the second operational mode based on the collected audial sample, causing the vehicle to switch from the first operational mode to a special operational mode.

11. The system of claim 10, wherein, in the special operational mode, the executable operations further include:

causing at least one of a haptic alert, an audial alert, or a visual alert to be provided to the vehicle driver.

12. The system of claim 9, wherein determining whether the vehicle driver is ready or non-ready for the greater degree of manual involvement for the second operational mode based on the collected audial sample includes comparing the collected audial sample to a previously provided baseline audial sample of the driver.

13. The system of claim 9, wherein the executable operations further include:

responsive to determining that an operational mode transition event has occurred, prompting the vehicle driver to provide the audial sample.

14. The system of claim 9, wherein collecting the audial sample from the vehicle driver is performed automatically.

15. The system of claim 9, further including:

one or more physiological sensors located within the vehicle, the one or more physiological sensors being operatively connected to the processor, and wherein the executable operations further include:

detecting, using the one or more physiological sensors, one or more physiological characteristics of the vehicle driver.

16. The system of claim 15, further including:

confirming the determination of whether the vehicle driver is ready or non-ready based on the detected one or more physiological characteristics of the vehicle driver.

17. A computer program product for assessing the readiness of a driver for transitioning a vehicle from a first operational mode to a second operational mode, the second operational mode having a greater degree of manual involvement than the first operational mode, the computer program product comprising a computer readable storage medium having program code embodied therein, the program code executable by a processor to perform a method comprising:

determining whether an operational mode transition event has occurred while the vehicle is operating in the first operational mode;

responsive to determining that an operational mode transition event has occurred, collecting an audial sample from a vehicle driver;

determining whether the vehicle driver is ready or non-ready to provide the greater degree of manual involvement for the second operational mode based on the collected audial sample; and responsive to determining that the vehicle driver is ready for the greater degree of manual involvement for the second operational mode based on the collected audial sample, causing the vehicle to switch from the first operational mode to the second operational mode.

\* \* \* \* \*